United States Patent
Anderson et al.

(10) Patent No.: US 7,421,617 B2
(45) Date of Patent: Sep. 2, 2008

(54) SYSTEMS AND METHODS FOR OPTIMIZING RESTORATION OF STORED DATA

(75) Inventors: Curtis Anderson, Saratoga, CA (US); John P. Woychowski, San Jose, CA (US); Pratik Wadher, Sunnyvale, CA (US)

(73) Assignee: Symantec Corporation, Cupertino, CA (US)

( * ) Notice: Subject to any disclaimer, the term of this patent is extended or adjusted under 35 U.S.C. 154(b) by 316 days.

(21) Appl. No.: 11/215,930

(22) Filed: Aug. 30, 2005

(65) Prior Publication Data

US 2006/0047996 A1 Mar. 2, 2006

Related U.S. Application Data

(60) Provisional application No. 60/605,168, filed on Aug. 30, 2004.

(51) Int. Cl.
*G06F 11/00* (2006.01)
(52) U.S. Cl. ....................................... 714/15
(58) Field of Classification Search .................. 714/15
See application file for complete search history.

(56) References Cited

U.S. PATENT DOCUMENTS

| | | | |
|---|---|---|---|
| 4,916,605 A | 4/1990 | Beardsley et al. | |
| 5,404,508 A | 4/1995 | Konrad et al. | |
| 5,504,861 A | 4/1996 | Crockett et al. | |
| 5,604,862 A * | 2/1997 | Midgely et al. | 714/6 |
| 5,745,672 A | 4/1998 | Stiffler | |
| 6,073,209 A | 6/2000 | Bergsten | |
| 6,085,200 A | 7/2000 | Hill et al. | |
| 6,363,462 B1 | 3/2002 | Bergsten | |
| 6,792,518 B2 | 9/2004 | Armangau et al. | |
| 6,845,435 B2 * | 1/2005 | Nagasawa et al. | 711/162 |
| 6,865,655 B1 | 3/2005 | Andersen | |
| 6,880,051 B2 | 4/2005 | Timpanaro-Perrotta | |
| 6,883,074 B2 | 4/2005 | Lee et al. | |
| 6,934,822 B2 | 8/2005 | Armangau et al. | |
| 7,107,486 B2 * | 9/2006 | Okada et al. | 714/20 |
| 7,165,154 B2 * | 1/2007 | Coombs et al. | 711/162 |
| 2003/0051111 A1 | 3/2003 | Nakano et al. | |
| 2004/0220961 A1 | 11/2004 | Lee et al. | |
| 2005/0076262 A1 | 4/2005 | Rowan et al. | |
| 2005/0132249 A1 | 6/2005 | Burton et al. | |
| 2006/0277431 A1 * | 12/2006 | Hsu | 714/6 |
| 2007/0006018 A1 * | 1/2007 | Thompson et al. | 714/6 |

OTHER PUBLICATIONS

U.S. Appl. No. 11/216,874, Curtis Anderson, Systems and Methods for Rapid Presentation of Historical Views of Stored Data, filed Aug. 30, 2005.

U.S. Appl. No. 11/166,690, Curtis Anderson, Systems and Method for Organizing and Mapping Data, filed Jun. 23, 2005.

(Continued)

*Primary Examiner*—Michael C Maskulinski
(74) *Attorney, Agent, or Firm*—Hunton & Williams LLP

(57) ABSTRACT

A system and method is provided for optimizing restoration of stored data. A request for data to be restored to any point in time is received. A current state of the data is determined. One or more data blocks required to modify the data from the current state to the any point in time requested are identified. The data at the any point in time is restored within a storage medium using the identified one or more data blocks.

27 Claims, 5 Drawing Sheets

OTHER PUBLICATIONS

U.S. Appl. No. 11/215,958, Curtis Anderson, Systems and Methods for Event Driven Recovery Management, filed Aug. 30, 2005.
U.S. Appl. No. 11/216,439, Curtis Anderson, Protocol for Communicating Data Block Copies in an Error Recovery Environment, filed Aug. 30, 2005.

Alexander, et al., "Crporate Business Servers: An Alternate to Mainframes for Business Computing," Hewlett-Packard Journal, Jun. 1994, vol. 45, No. 3, pp. 8-30.

* cited by examiner

SYSTEMS AND METHODS FOR OPTIMIZING RESTORATION OF STORED DATA

CROSS-REFERENCE TO RELATED APPLICATIONS

The present application claims the benefit and priority of U.S. provisional patent application Ser. No. 60/605,168, filed on Aug. 30, 2004, and entitled "Image Manipulation of Data," which is herein incorporated by reference.

The present application is related to co-pending U.S. application Ser. No. 11/166,690, entitled "Systems and Methods for Organizing and Mapping Data," filed on Jun. 23, 2005, co-pending U.S. application Ser. No. 11/215,958, "Systems and Methods for Event Driven Recovery Management", filed on Aug. 30, 2005, co-pending U.S. application Ser. No. 11/216,874, entitled "Systems and Methods for Rapid Presentation of Historical Views of Stored Data", filed on Aug. 30, 2005, and co-pending U.S. application co-pending U.S. application Ser. No. 11/216,439, entitled "Protocol for Communicating Data Block Copies in an Error Recovery Environment", filed Aug. 30, 2005, which are herein incorporated by reference.

BACKGROUND OF THE INVENTION

1. Field of the Invention

The present invention relates generally to recovery management, and more particularly to systems and methods for optimizing restoration of stored data.

2. Description of Related Art

Conventionally, recovery management has been overseen by various systems that keep track of data being written to a storage medium. Recovery management may be necessary to recover data that has been altered by a disk crash, a virus, erroneous deletions, overwrites, and so on. Numerous other reasons are cited by companies and individuals for requiring access to data as it existed at one point in time.

Back-up methods for storing data are necessary before the data can be recovered. Back-up methods may include the activity of copying files or databases so that they will be preserved in case of equipment failure or other catastrophe. Some processes may involve copying backup files from backup media to hard disk in order to return data to its original condition. Other techniques may include an ability to periodically copy contents of all or a designated portion of data from the data's main storage device to a cartridge device so the data will not be lost in the event of a hard disk crash.

Backup procedures, such as those described above, require a great deal of processing power from the server performing the backups. For this reason, backup procedures may be off-loaded from a server so that the time ordinarily devoted to backup functions can be used to carry out other server tasks. For example, in some environments, an intelligent agent may be utilized to offload the backup procedures. The intelligent agent may take a "snapshot" of a computer's data at a specific time so that if future changes cause a problem, the system and data may be restored to the way they were before the changes were made.

Once copies of the data have been made in some manner, data recovery may be utilized to recover the data using the copies. Data recovery seeks to return the data to a state before particular changes were made to the data. Thus, the data may be recovered to different points in time, depending upon the state of the data a user may want to access.

Unfortunately, recovering the data can be a time consuming process. The user's other tasks may be delayed by a delay in restoring the data per the user's request.

Therefore, there is a need for a system and method for optimizing restoration of stored data.

SUMMARY OF THE INVENTION

The present invention provides a system and method for optimizing restoration of stored data. In a method according to one embodiment, a request for data to be restored to any point in time is received. A current state of the data is determined. One or more data blocks required to modify the data from the current state to the any point in time requested are identified. The data at the any point in time is restored within a storage medium using the identified one or more data blocks.

DESCRIPTION OF EXEMPLARY EMBODIMENTS

Figure 1:
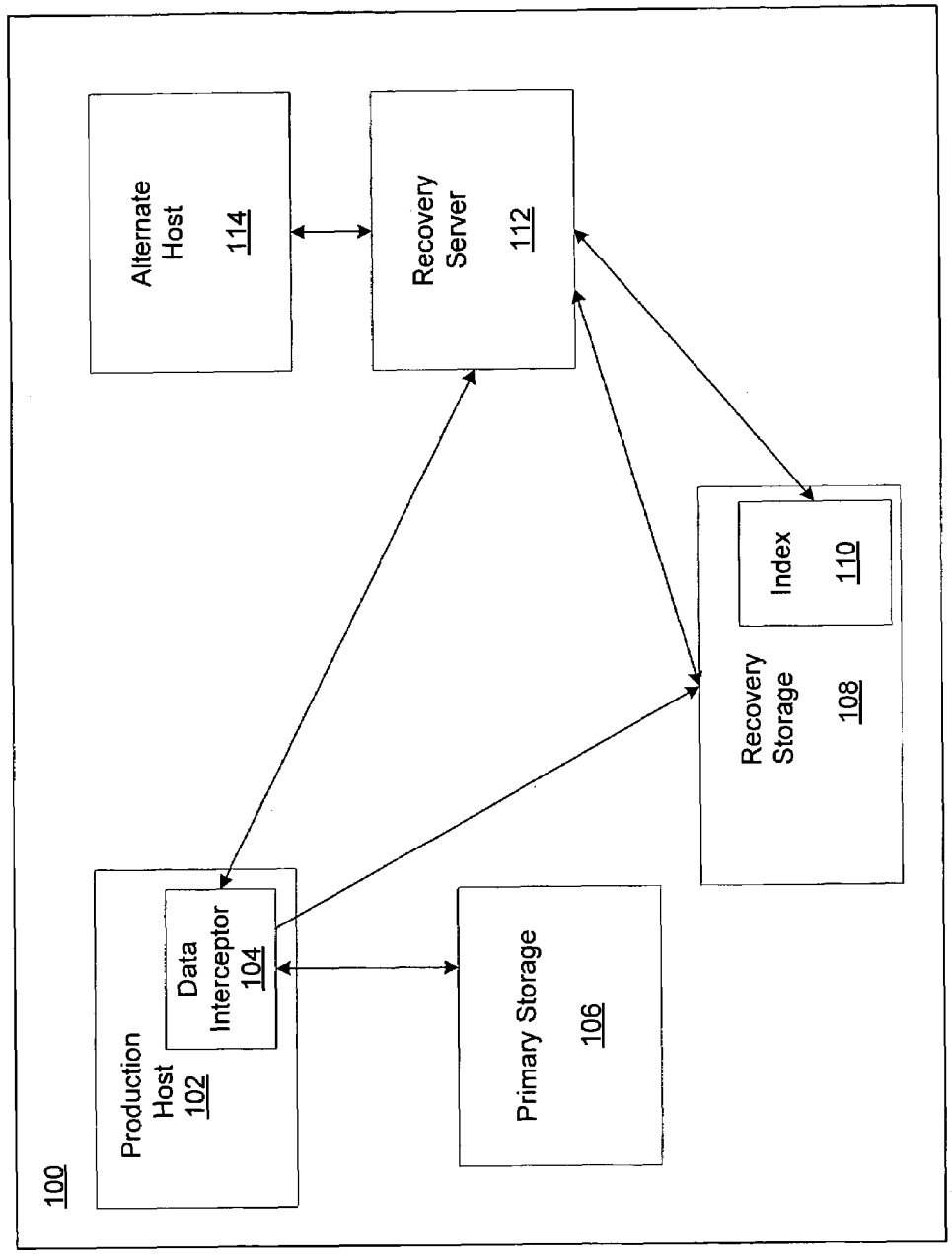
FIG. 1 illustrates a schematic diagram of an exemplary environment for protecting stored data.

FIG. 1 shows a schematic diagram of an exemplary environment for protecting stored data. Fibre Channel (FC) may be utilized to transmit data between the components shown in FIG. 1. However, any type of system (e.g., optical system), in conjunction with FC or alone, may be utilized for transmitting the data between the components.

The exemplary environment 100 comprises a production host 102 for creating various types of data. For example, a financial software program running on the production host 102 can generate checkbook balancing data. Any type of data may be generated by the production host 102. Further, the production host 102 may include any type of computing device, such as a desktop computer, a laptop, a server, a personal digital assistant (PDA), and a cellular telephone. In a further embodiment, a plurality of production hosts 102 may be provided.

The production host 102 may include a data interceptor 104. For example, a data tap that captures and duplicates data blocks or any other type of data may comprise the data interceptor 104 according to some embodiments. The data interceptor 104 may be any hardware, software, or firmware that resides on the production host 102, or otherwise accesses the data generated by the production host 102. For example, the data interceptor 104 may be embedded in a SAN switch or a disk array controller. According to exemplary embodiments, the data interceptor 104 may be coupled to, or reside on, one or more production hosts 102. Conversely, in some embodiments, the production host 102 may include or be coupled to more than one data interceptor 104.

The data interceptor 104 copies data created by the production host 102 and stores the data ("data blocks") in a primary storage 106 associated with the production host 102. The copies of the data blocks ("data block copies") are stored to recovery storage 108. The recovery storage 108 may comprise any type of storage, such as time addressable block storage ("TABS"). Although "data blocks" and "data block copies" is utilized to describe the data created and the copies of the data generated, files, file segments, data strings and any other data may be created and copies generated according to various embodiments. Further, the data blocks and the data block copies may be a fixed size or varying sizes.

The primary storage 106 and/or the recovery storage 108 may include random access memory (RAM), hard drive memory, a combination of static and dynamic memories, or any other memory resident on the production host 102 or coupled to the production host 102. The primary storage 106 may include any storage medium coupled to the production host 102 or residing on the production host 102. In one embodiment, the data interceptor 104 may store the data blocks to more than one of the primary storage 106.

According to one embodiment, the data interceptor 104 can create data block copies from the data blocks after the production host 102 stores the data blocks to the primary storage 106 or as the data blocks are generated by the production host 102.

Data blocks are typically created from the production host 102 each instant a change to existing data at the primary storage 106 is made. Accordingly, a data block copy may be generated each time the data block is generated, according to exemplary embodiments. In another embodiment, the data block copy may comprise more than one data block. Each data block copy and/or data block may reflect a change in the overall data comprised of the various data blocks in the primary storage 106.

In exemplary embodiments, the data interceptor 104 intercepts each of the data blocks generated by the production host 102 in order to create the data block copies. The data block is sent to the primary storage 106 by the data interceptor 104, while the data interceptor 104 sends the data block copy to the recovery storage 108, as discussed herein. The data block copies may be combined to present a view of data at a recovery point (i.e., as the data existed at a point in time), called a "historical view." In other words, the data block copies may be utilized to re-create the data (i.e., the data blocks stored in the primary storage 106) as it existed at a particular point in time. The "historical view" of the data may be provided to a user requesting the data as a "snapshot" of the data. The snapshot may comprise an image of the data block copies utilized to create the historical view, according to one embodiment.

In an alternative embodiment, the data interceptor 104, or any other device, may compare the data blocks being generated with the data blocks already stored in the primary storage 106 to determine whether changes have occurred. The copies of the data blocks may then be generated when changes are detected.

The historical view may also be used to present an image of all of the data in the primary storage 106 utilizing some of the data block copies in the recovery storage 108 and some of the data blocks in the primary storage 106. In other words, the historical view at time x may be recreated utilizing some of the data blocks from the primary storage 106 and some of the data block copies from the recovery storage 108, rather than only the data block copies from the recovery storage 108. Thus, the data block copies from the recovery storage 108 may be combined with the data blocks from the primary storage 106 in order to create the historical view.

In one embodiment, the production host 102 reserves private storage or temporary storage space for the data interceptor 104. The private storage space may be utilized by the data interceptor 104 for recording notes related to the data blocks, for temporarily storing the data block copies, or for any other purpose. For instance, if the recovery server 112 is not available to instruct the data interceptor 104 where to store the data block copies in the recovery storage 108, the temporary storage may be utilized to store the data block copies until the recovery server 112 is available.

Similarly, the temporary storage may be utilized to store the data block copies if the recovery storage 108 is unavailable. Once the recovery server 112 and/or the recovery storage 108 is once again available, the data block copies may then be moved from the temporary storage to the recovery storage 108 or any other storage.

In another embodiment, the data interceptor 104, using a bit map or any other method, tracks the data blocks from the production host 102 that change. Accordingly, if the recovery server 112 and/or the recovery storage 108 is unavailable, the data interceptor 104 records which data blocks on the primary storage 106 change. The data interceptor 104 can copy only the data blocks from the primary storage 106 to the recovery storage 108 that changed while the recovery server 112 and/or the recovery storage 108 were unavailable. Specifically, the data interceptor 104 or any other device flags each data block generated by the production host 102 that changes. The flags are referenced when the recovery server 112 and/or the recovery storage 108 are available to determine which data blocks were changed during the time the recovery server 112 and/or the recovery storage 108 were unavailable. Although each data block may change more than one time, each of the data blocks reflecting the most recent change to the data blocks when the recovery server 112 and/or the recovery storage 108 become available are the data blocks that are copied to the recovery storage 108 from the primary storage 106.

In yet another embodiment, the data interceptor 104 may continue to store the data block copies to an area of the recovery storage 108 allocated for data block copies from the data interceptor 104 by the recovery server 112 prior to the recovery server 112 becoming unavailable. In other words, if the recovery server 112 is unavailable, but the recovery server 112 has previously instructed the data interceptor 104 to store the data block copies to a specified area of the recovery storage 108, the data interceptor 104 can continue to store the data block copies to the specified area until the specified area is full and/or the recovery server 112 becomes available.

In still a further embodiment, a backup recovery server may be provided to provide the recovery server 112 functions if the recovery server 112 is unavailable. As discussed herein, more than one recovery server 112 may be provided. Similarly, more than one production host 102 may be provided, as a set of computing devices or other configuration, with other production hosts 102 in the set capable of performing functions associated with the production host 102 in the event the production host 102 becomes unavailable.

The exemplary data interceptor 104 also creates metadata in one or more "envelopes" to describe the data block copies and/or the data blocks. The envelopes may include any type of metadata. In exemplary embodiments, the envelopes include metadata describing the location of the data block in the primary storage 106 (i.e., a logical block address "LBA"), the size of the data block and/or the data block copies, the location of the data block copy in the recovery storage 108, or any other information related to the data. In exemplary embodiments, the envelopes associated with the data block copies preserve the order in which the data blocks are created by including information about the order of data block creation by the production host 102. The protocol for communicating data block copies is described in further detail in co-pending U.S. application Ser. No. 11/216,439 entitled "Protocol for Communication Data Block Copies in an Error Recovery Environment," filed on Aug. 30, 2005.

The data interceptor 104 forwards the envelopes to a recovery server 112. The data interceptor 104 may associate one or more unique identifiers, such as a snapshot identifier ("SSID"), with the data block copies to include with one or more of the envelopes. Alternatively, any device can associate the unique identifiers with the one or more envelopes, including the data interceptor 104. The recovery server 112 may also designate areas of the recovery storage 108 for storing one or more of the data block copies in the recovery storage 108 associated with the one or more envelopes. When the data interceptor 104 stores the data block copies to the recovery storage 108, the data interceptor 104 can specify in the associated envelopes where the data block copy was stored in the recovery storage 108. Alternatively, any device can designate the physical address for storing the data block copies in the recovery storage 108.

The unique identifiers may be assigned to single data block copies or to a grouping of data block copies. For example, the recovery server 112 or other device can assign the identifier to each data block copy after the data block copy is created by the data interceptor 104, or the unique identifier may be assigned to a group of the data block copies.

Figure 3:
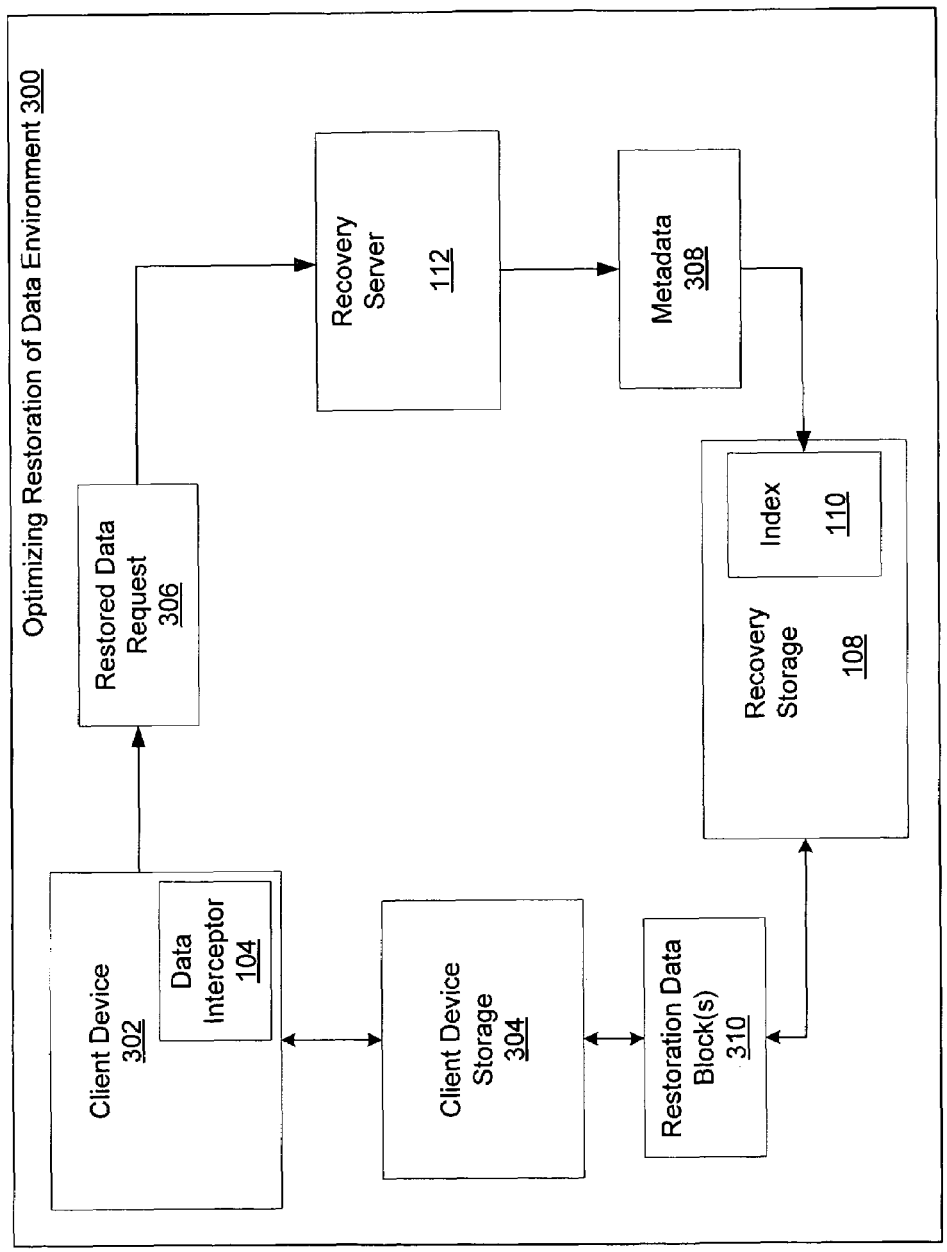
FIG. 3 illustrates a schematic diagram of an exemplary environment for optimizing restoration of stored data.

The recovery server 112 uses the envelopes to create a recovery index (discussed infra in association with FIG. 3). The recovery server 112 then copies the recovery index to the recovery storage 108 as an index 110. The index 110 maps the envelopes to the data block copies in the recovery storage 108. Specifically, the index 110 maps unique identifiers, such as addresses or sequence numbers, to the data block copies using the information included in the envelopes. In alternative embodiments, the index 110 may be stored in other storage mediums or memory devices coupled to the recovery storage 108 or any other device.

In exemplary embodiments, the data interceptor 104 forwards the data block copies and the envelope(s) to the recovery storage 108. The recovery storage 108 may include the index 110, or the index 110 may otherwise be coupled to the recovery storage 108. More than one recovery storage 108 and/or indexes 110 may be utilized to store the data block copies and the envelope(s) for one or more production hosts 102 according to various embodiments. Further, the recovery storage 108 may comprise random access memory (RAM), hard drive memory, a combination of static and dynamic memories, direct access storage devices (DASD), or any other memory. The recovery storage 108 and/or the index 110 may comprise storage area network (SAN)-attached storage, a network-attached storage (NAS) system, or any other system or network.

The unique identifiers, discussed herein, may be utilized to locate each of the data block copies in the recovery storage 108 from the index 110. As discussed herein, the index 110 maps the envelopes to the data block copies according to the information included in the envelopes, such as the unique identifier, the physical address of the data block copies in the recovery storage 108, and/or the LBA of the data blocks in the primary storage 106 that correspond to the data block copies in the recovery storage 108. Accordingly, the recovery server 112 can utilize a sort function in coordination with the unique identifier, such as a physical address sort function, an LBA sort function, or any other sort function to locate the data block copies in the recovery storage 108 from the map provided in the index 110.

The recovery server 112 is also coupled to the recovery storage 108 and the index 110. In an alternative embodiment, the recovery server 112 may instruct the data interceptor 104 on how to create the index 110 utilizing the envelopes. The recovery server 112 may communicate any other instructions to the data interceptor 104 related to the data blocks, the data block copies, the envelope(s), or any other matters. Further, the recovery server 112 may be coupled to more than one recovery storage 108 and/or indexes 110.

As discussed herein, the index 110 may be utilized to locate the data block copies in the recovery storage 108 and/or the data blocks in the primary storage 106. Any type of information may be included in the envelope(s), such as a timestamp, a logical unit number (LUN), a logical block address (LBA), access and use of data being written for the data block, a storage media, an event marker associated with the data block, a sequence number associated with the data block, an identifier for a group of data block copies stemming from a historical view of the data, and so on.

In one embodiment, the envelopes are indexed according to the metadata in the envelopes, which may be utilized as keys. For example, a logical address index may map logical addresses found on the primary storage 106 to the data block copies in the recovery storage 108. A physical address index may map each physical data block copy address in the recovery storage 108 to the logical address of the data block on the primary storage 106. Additional indexing based on other payload information in the envelopes, such as snapshot identifiers, sequence numbers, and so on are also within the scope of various embodiments. One or more indexes 110 may be provided for mapping and organizing the data block copies.

One or more alternate hosts 114 may access the recovery server 112. In exemplary embodiments, the alternate hosts 114 may request data as it existed at a specific point in time or the recovery point (i.e. the historical view of the data) on the primary storage 106. In other words, the alternate host 114 may request, from the recovery server 112, data block copies that reveal the state of the data as it existed at the recovery point (i.e., prior to changes or overwrites to the data by further data blocks and data block copies subsequent to the recovery point). The recovery server 112 can provide the historical view of the data as one or more snapshots to the alternate hosts 114, as discussed herein.

The alternate hosts 114, or any other device requesting and receiving restored data, can utilize the historical view to generate new data. The new data can be saved and stored to the recovery storage 108 and/or referenced in the index 110. The new data may be designated by users at the alternate hosts 114 as data that should be saved to the recovery storage 108 for access by other users. The recovery server 112 may create envelopes to associate with the new data and store the envelopes in the index 110 in order to organize and map the new data in relation to the other data block copies already referenced in the index 110. Accordingly, the alternate hosts 114 or other device can create various new data utilizing the historical views as the basis for the various new data.

Each of the alternate hosts 114 may include one or more data interceptors 104 according to alternate embodiments. In another embodiment, a single data interceptor 104 may be coupled to one or more of the alternate hosts 114. In yet a further embodiment, the data interceptor 104 functions may be provided by the recovery server 112.

An interface may be provided for receiving requests from the alternate host 114. For instance, a user at the alternate host 114 may select a recovery point for the data from a drop down menu, a text box, and so forth. In one embodiment, the recovery server 112 recommends data at a point in time that the recovery server 112 determines is ideal given parameters entered by a user at the alternate host 114. However, any server or other device may recommend recovery points to the alternate host 114 or any other device. Predetermined parameters may also be utilized for requesting recovered data and/or suggesting optimized recovery points. Any type of variables may be considered by the recovery server 112 in providing a recommendation to the alternate host 114 related to data recovery.

The production host 102 may produce event marker to associate with the data blocks and/or the data block copies. For example, the data interceptor 104 may associate an end of a third quarter with data block copies indicating that the data block copies occurred during or around the end of the third quarter. In one embodiment, a request for a historical view constitutes an event and the event marker may be associated with the one or more data block copies comprising the historical view for later reference. For example, the historical view may be retrieved at a future time by referring to the event marker that indicates the last time the same historical view was requested.

The event markers may be associated with a clock associated with the primary storage 106, the recovery storage 108, or any other storage medium. Accordingly, the clock may assign a time to the storage medium as each copy of the data blocks are stored or in between storage of the data blocks.

Alternatively, the production host 102, the data interceptor 104, the recovery server 112, or any other device may assign one or more points in time to the copies of the data blocks themselves or the one or more points in time may comprise an event marker that identifies events that occur when the data block copies are not being stored to the storage medium. As discussed herein, event markers may comprise one or more points in time that do not coincide with the generation and/or storage of the one or more data block copies. In other words, the event markers may be associated with one or more points in time between the generation and/or storage of the one or more data block copies.

Thus, the event makers may simply indicate a state of the data in the primary storage 106 at the time a particular event associated with the event marker occurred. In other words, no data blocks may have been written and/or stored to the primary storage 106 when the particular event occurred.

In another embodiment, the events may be imported or provided by an entity or resource other than the production host 102 to associate with the event markers. Any source may provide events to associate with the event markers for the data blocks and/or the data block copies. The association of the event markers with the data blocks and/or the data block copies may be implicit or indirect. In other words, the event marker may be associated with a state of the data at a point in time, as discussed herein. A branching data structure and searching may be utilized to establish an actual state of the data corresponding with the point in time. For instance, a major news event may be associated with the data block copies for simple reference back to a noteworthy date, time, and so forth. The event markers may be associated with the data block copies as the data block copies are created by the data interceptor 104 or at any time after the data block copies have been created. Any type of event marker may be associated with the data.

A sequence number of each of the data block copies may be associated with the event marker. Accordingly, one or more data block copies associated with an event marker may be located according to the sequence number.

A text string may be provided for describing an event for the event marker. As discussed herein, any type of information may constitute an event. For example, a text string with an author's name may be included so that the data block copies may later be retrieved by searching for historical views comprised of data block copies associated with the author's name. In one embodiment, the author's name, or other text string, may be associated with an event marker, which is then associated with the data block copies. Accordingly, the author's name may not be directly associated with the data block copies. Similarly, a sequence number or any other unique identifier, as discussed herein, may be associated with the data block copy having the particular event marker associated with the data block copy. The unique identifier may then be utilized to locate the data block copy in the recovery storage 108 via the index 110. The data block copies required to reconstruct a historical view of data requested by a user may then be provided to the user, based on one or more events described by the user.

In exemplary embodiments, one or more event marker are utilized in combination with one or more timestamps in order to locate historical views that correlate with the one or more event markers. For example, if corruption to data occurred approximately ten minutes preceding a particular event from an event marker, or at any other time related to the event, the data can be recovered using the event and the data as it existed 10 minutes prior to the event. Any type of integration, combination, cross-reference, relationship, and so forth between the event markers and the timestamps or any other information may be utilized to locate or recreate the data. In another embodiment, a user can request all the data that occurred between one or more event markers.

The user may select an event or enter an event associated with the historical view desired in order to help the recovery server 112 locate the appropriate data block copies corresponding to the event marker in the recovery storage 108. The recovery server 112 can match the event information from the user with the event marker associated with the historical view. The event information from the user may directly match the event marker associated with the historical view or the recovery server 112 may determine what event marker best matches the event information from the user.

In some embodiments, the event information from the user can be matched with data outside of the recovery server 112. For example, a computing device that coordinates the activities of more than one recovery server 112 may receive the event information from the user and provide instructions to the recovery servers 112 for locating the event markers indicating the historical views that correlate with the event information or forward the request from the user to the recovery servers 112 or an appropriate recovery server 112.

Figure 2:
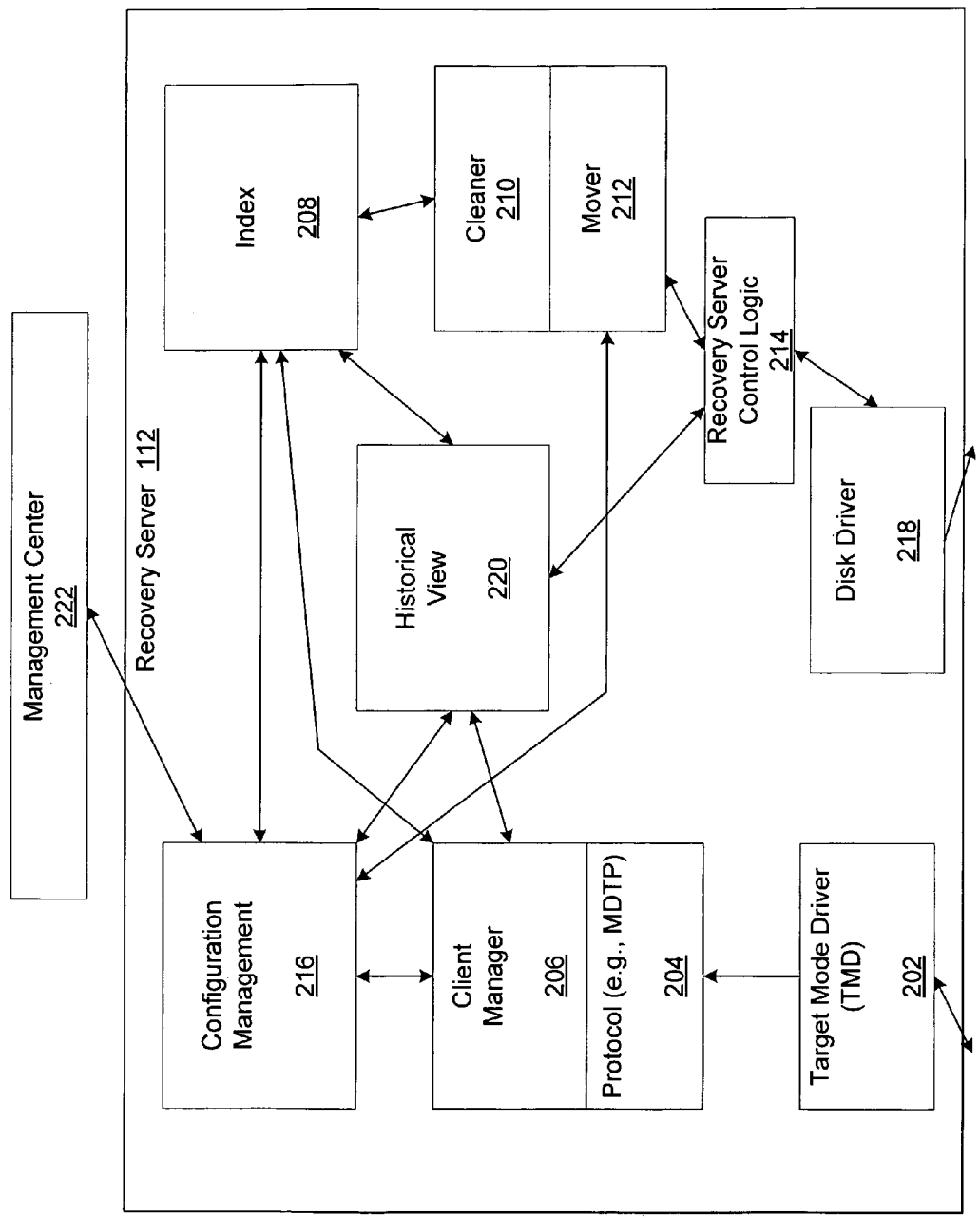
FIG. 2 illustrates a schematic diagram for exemplary recovery server coordination for optimizing restoration of stored data.

FIG. 2 shows a schematic diagram for exemplary recovery server coordination for optimizing restoration of stored data. An optimized rollback is the optimal restoration of stored data. One or more envelopes arrive at the recovery server 112 via a target mode driver (TMD) 202. The TMD 202 responds to commands for forwarding the envelopes. Alternatively, any type of driver may be utilized for communicating the envelopes to the recovery server 112.

The envelopes may be forwarded by the data interceptor 104 utilizing a proprietary protocol 204, such as the Mendocino Data Tap Protocol (MDTP). A client manager 206 may be provided for coordinating the activities of the recovery server 112. The envelopes are utilized by the recovery server 112 to construct a recovery index 208. The recovery index 208 is then copied to the index 110 (FIG. 1) associated with the recovery storage 108 (FIG. 1). In order to update the index 110, the recovery index 208 may be updated and copied each time new envelopes arrive at the recovery server 112 or the recovery server 112 may update the index 110 with the new envelope information at any other time.

Optionally, a cleaner 210 defragments the data block copies and any other data that is stored in the recovery storage 108. As another option, a mover 212 moves the data block copies (i.e. the snapshots) in the recovery storage 108 and can participate in moving the data block copies between the recovery storage 108, the production host 102, the alternate hosts 114 (FIG. 1), and/or any other devices.

Recovery storage control logic 214 manages storage of the envelopes and the data block copies in the recovery storage 108 using configuration information generated by a configuration management component 216. A disk driver 218 then stores (e.g., writes) the envelopes and the data block copies to the recovery storage 108.

When a user requests a historical view of the data, as discussed herein, a historical view component 220 retrieves the data block copies needed to provide the historical view requested by a user. The user may request the historical view based on an event marker or any other criteria. Specifically, the historical view component 220 references the recovery index 208 or the index 110 pointing to the data block copies in the recovery storage 108. The historical view component 220 then requests the data block copies, corresponding to the envelopes in the index 110, from the recovery storage control logic 214. The disk driver 218 reads the data block copies from the recovery storage 108 and provides the data block copies to the historical view component 220. The data block copies are then provided to the user at the alternate host 114 that requested the data.

As discussed herein, according to one embodiment, the historical view may be constructed utilizing the data block copies from the recovery storage 108 and the data blocks from the primary storage 106. Thus, the data block copies may be utilized to construct a portion of the historical view while the data blocks may be utilized to construct a remaining portion of the historical view.

The user of the historical view may utilize the historical view to generate additional data blocks, as discussed herein. Copies of the data blocks may then be stored in the recovery storage 108 along with corresponding envelopes. The recovery server 112 then updates the index 110 to include references to the new data block copies. Accordingly, the new data block copies are tracked via the index 110 in relation to other data block copies already stored in the recovery storage 108. One or more event markers may be associated with the new data block copies, as the copies are generated or at any other time. As discussed herein, the event markers may be directly associated with the new data block copies, or they event markers may be indirectly associated with the new data block copies. According to some embodiments, generating the new data block copies constitutes an event to associate with an event marker, itself.

A branching data structure that references the index 110 may be provided. The branching data structure can indicate a relationship between original data and modifications that are stored along with the original data upon which those modifications are based. Modifications can continue to be stored as the modifications relate to the data upon which the modifications are based, so that a hierarchical relationship is organized and mapped. By using the branching data structure, the various data block copies relationship to one another can be organized at a higher level than the index 110. The branching data structure and the index 110 may comprise a single structure according to some embodiments. According to further embodiments, the branching data structure, the index 110, and/or the data block copies may comprise a single structure.

The branches in the branching data structure may be created when the historical views are modified, or when data blocks from the primary storage 106 are removed or rolled back to a point in time (i.e. historical view). Event markers may be inserted on the branches after the branches are generated. The data interceptor 104 functionality, as discussed herein, may be provided by any components or devices. Branching tree structures and the process of generating event markers is described in further detail in co-pending U.S. application Ser. No. 11/166,690, entitled "Systems and Methods for Organizing and Mapping Data," filed on Jun. 23, 2005, and co-pending U.S. application Ser. No. 11/215,958, entitled "Systems and Methods for Event Driven Recovery Management," filed on Aug. 30, 2005.

In some embodiments, a historical view component, such as the historical view component 220 discussed herein, residing at the recovery server 112 may provide historical views to an alternate server, such as the alternate host 114 discussed herein or any other device. The alternate server may then utilize the historical view to generate additional data blocks. For example, the alternate server may write data on top of the historical view. The additional data blocks may be generated by the alternate server using the historical view component at the recovery server 112. The historical view component 220 may then generate envelopes and store the envelopes and the data blocks in the recovery server 112, as well as update the index 110 accordingly. Thus, the historical view component 220 in some embodiments provides functions similar to the functions that may be provided by the data interceptor 104. In other embodiments, the historical view component 220 resides outside of the recovery server 112, but is coupled to the recovery server 112 and the recovery storage 108 in order to provide functionalities similar to the data interceptor 104. Further, the production host 102 and the alternate server may comprise a single device according to some embodiments. As discussed herein, the primary storage 106 and the recovery storage 108 may comprise one storage medium according to some embodiments. Historical views are further described within co-pending U.S. application Ser. No. 11/216,874, entitled "Systems and Methods for Rapid Presentation of Historical Views of Stored Data," filed on Aug. 30, 2005.

In other embodiments, the production host 102 includes the historical view component 220 and a data interceptor 104, both residing on the production host 102. However, the historical view component 220 and/or the data interceptor 104 may reside outside of, but be coupled to, the production host 102 in other embodiments. Further, the historical view component 220 and the data interceptor 104 may comprise one component in some embodiments. The generation of envelopes, data blocks, data block copies, indexes, and so forth may be performed by the historical view component 220 and/or the data interceptor 104 at the production host 102 in such an embodiment.

As discussed herein, the historical view component 220 may request data blocks from the primary storage 106 and/or data block copies from the recovery storage 108 in order to generate the historical view. Further, the additional data blocks generated utilizing the historical view (i.e. on top of the historical view) may be stored to either the primary storage 106, the recovery storage 108, or to both the primary storage 106 and the recovery storage 108. The primary storage and the recovery storage may be combined into one unified storage in some embodiments.

A management center 222 may also be provided for coordinating the activities of one or more recovery servers 112, according to one embodiment.

Although FIG. 2 shows the recovery server 112 having various components, the recovery server 112 may include more components or fewer components than those listed and still fall within the scope of various embodiments.

Turning to FIG. 3, a schematic diagram of an exemplary environment 300 for optimizing restoration of stored data is shown. A client device 302 includes a data interceptor 104 (FIG. 1). The client device 302 may comprise the production host 102 (FIG. 1), the alternate host 114 (FIG. 1), or any other device. In some embodiments, the client device 302 does not include the data interceptor 104.

The client device 302 is coupled to a client device storage 304. The client device storage 304 may comprise the primary storage 106 discussed in FIG. 1 or any other storage. In some embodiments, the client device storage 304 resides on the client device 302. The client device storage 304 automatically stores data blocks generated by the client device 302.

A user at the client device 302 submits a restored data request 306. The user may, for example, wish to obtain a version of a document from a day ago or from any other time. Any reason or parameters associated with the restored data request 306 may exist.

The recovery server 112 receives the restored data request 306. The recovery server 112 determines a current state of the storage. The current state of the storage may be determined via the recovery storage 108, since the recovery storage 108 includes at least the data blocks contained in the client device storage 304, or the current state of the storage may be determined directly from the client device storage 304. Typically, the current state of the storage is determined via the envelopes, discussed herein. The recovery server 112 then determines how many data blocks are required to restore the data to a point in time requested by the user in the restored data request 306. Specifically, the recovery server 112 reviews the current state of the storage and a state of the storage if restored to a time associated with the restored data request 306 and determines the data blocks required to make the transition from the current state to a desired restoration state.

The recovery server 112 then locates the data blocks required from the recovery storage 108 by using the metadata 308 and the index 110. The metadata 308 indicates the exact location of the data blocks in the recovery storage 108. Once the data blocks are located, the restoration data block(s) 310 are copied into the client device storage 304 in order to return the user's client device 302 to the desired state, per the restored data request 306. In some embodiments, the data blocks are copied from the recovery storage 108 through data interceptor 104 to the client device storage 304. The branching tree, discussed herein, can be utilized to locate the fewest number of data blocks required to restore the data according to the restored data request 306 or any other process may be employed by the recovery server 112.

The restored data request 306 can include any type of parameters for specifying the desired restoration of data. For example, any point in time can be specified, an event can be specified, and/or a condition associated with an external application can be specified.

Figure 4:
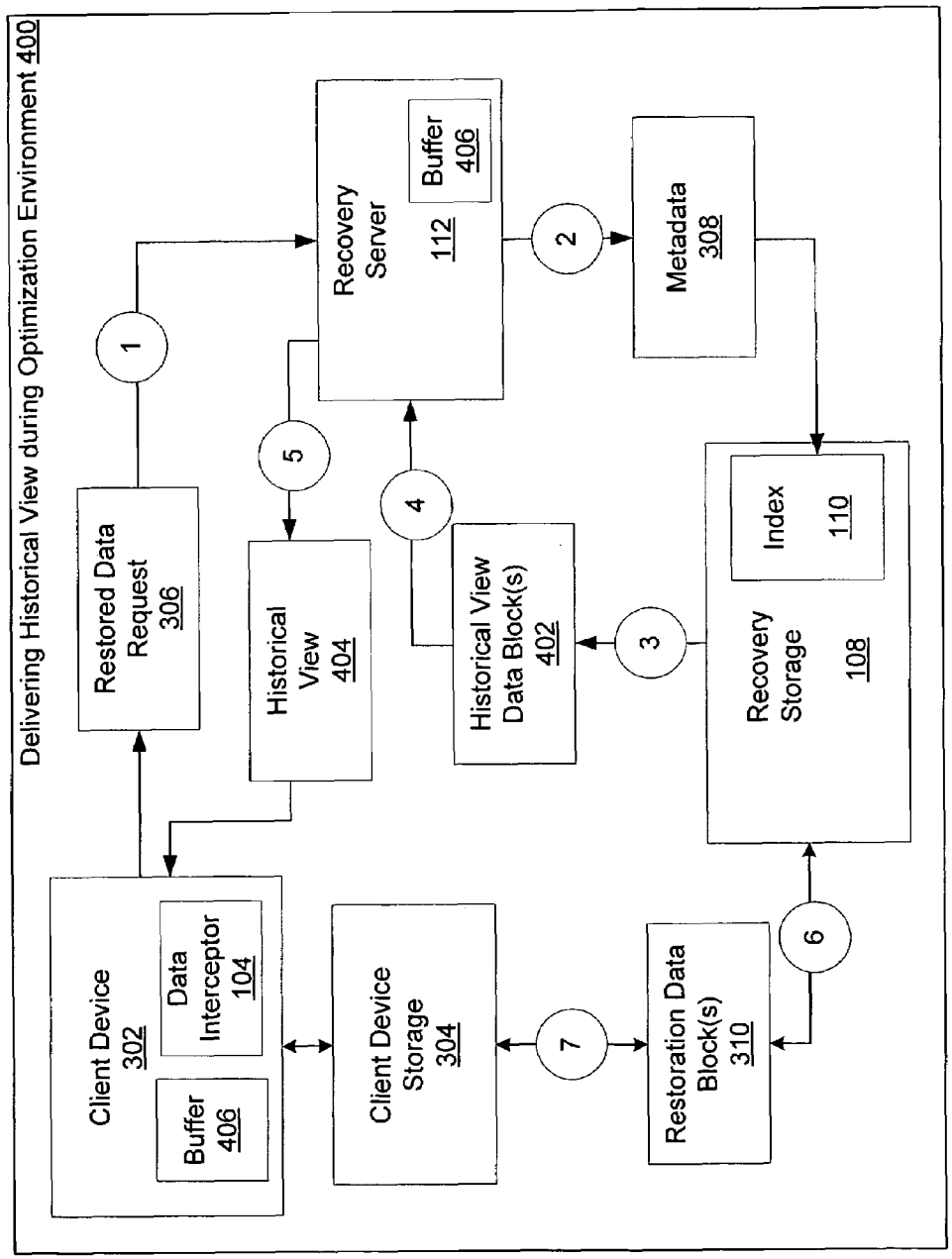
FIG. 4 illustrates a schematic diagram of an exemplary environment for delivering a historical view of data during optimizing restoration of the stored data.

FIG. 4 shows a schematic diagram of an exemplary environment 400 for providing a historical view during optimizing restoration of stored data, according to some embodiments. In this embodiment, the recovery server 112 receives the restored data request 306 from the client device 302 and determines which historical view data block(s) 402 (i.e., data blocks and/or data block copies) may be utilized to construct the historical view of the data. As discussed herein, the historical view comprises a view of the data at any point in time. The data block copies from the recovery storage 108 may be combined with the actual data blocks from the client device storage 304 (e.g., the primary storage 106) to generate the historical view. The data block copies and the data blocks may both reside in the recovery storage 108 or the data blocks may reside separately from the data block copies in the client device storage 304. The recovery server 112 locates and utilizes metadata 308 to locate pointers in the index 110 that indicate the location of the historical view data block(s) 402 needed for the historical view in the recovery storage 108. The recovery storage 108 retrieves the historical view data block(s) 402 from the recovery storage 108 and assembles them into the historical view of the stored data that correlates with the restored data request 306 from the user at the client device 302.

The recovery server 112 then presents the historical view 404 to the client 302. Any type of manner for presenting the historical view 404 to the user is within the scope of various embodiments. Further, the same historical view 404 can be presented to more than one user simultaneously. The historical view 404 comprises the combination of data block copies and/or data blocks (i.e., historical view data block(s) 402) that represent the state of data at any point in time. Thus, the same historical view 404 can be presented indefinitely. Accordingly, the historical view 404 can be modified by one or more users and the original historical view 404 presented to those one or more users to modify remains available.

While the user at the client device 302 receives the historical view 404 rapidly, the recovery server 112 continues the process of optimizing restoration of the stored data per the restored data request 306 from the user. The data blocks generated by the user at the client device 302 utilizing the historical view 404 may be transmitted to the recovery storage 108 by the data interceptor 104. These data blocks may then be added to the restoration process and ultimately sent to the client device storage 304.

In other embodiments, the data blocks generated by the user at the client device 302 utilizing the historical view 404 are buffered by a buffer 406 at the client device 302, the client device storage 304, and/or at the recovery server 112. When the data is restored according to the restored data request 306, the data blocks generated utilizing the historical view 404 are then stored to the recovery storage 108 and the client device storage 304.

In these embodiments, the buffer 406 at the client device 302, the buffer 406 at the recovery server 112, and/or the buffer at the client device storage 304 (not depicted) may be activated by the recovery server 112 in response to receiving the restored data request 306. Thus, the client device 302 ceases to store data blocks generated to the client device storage 304, and possibly the recovery storage 108, while the restored data request 306 is processed by the recovery server 112. The recovery server 112, the data interceptor 104, the client device 302, or any other device can signal the client device 302 to stop buffering the data blocks generated to the buffer 406 and to continue storing the data blocks generated to the client device storage 304.

In some embodiments, the user at the client device 302 may submit a restored data request 306 and continue to generate data blocks unrelated to the restored data request 306. Accordingly, the buffer 406 at the client device 302 may store the data blocks generated during the optimizing restoration of data process. When the restoration of the data is completed, the data blocks generated and stored to the buffer 406 are transferred to the recovery storage 108 and the client device storage 304.

Figure 5:
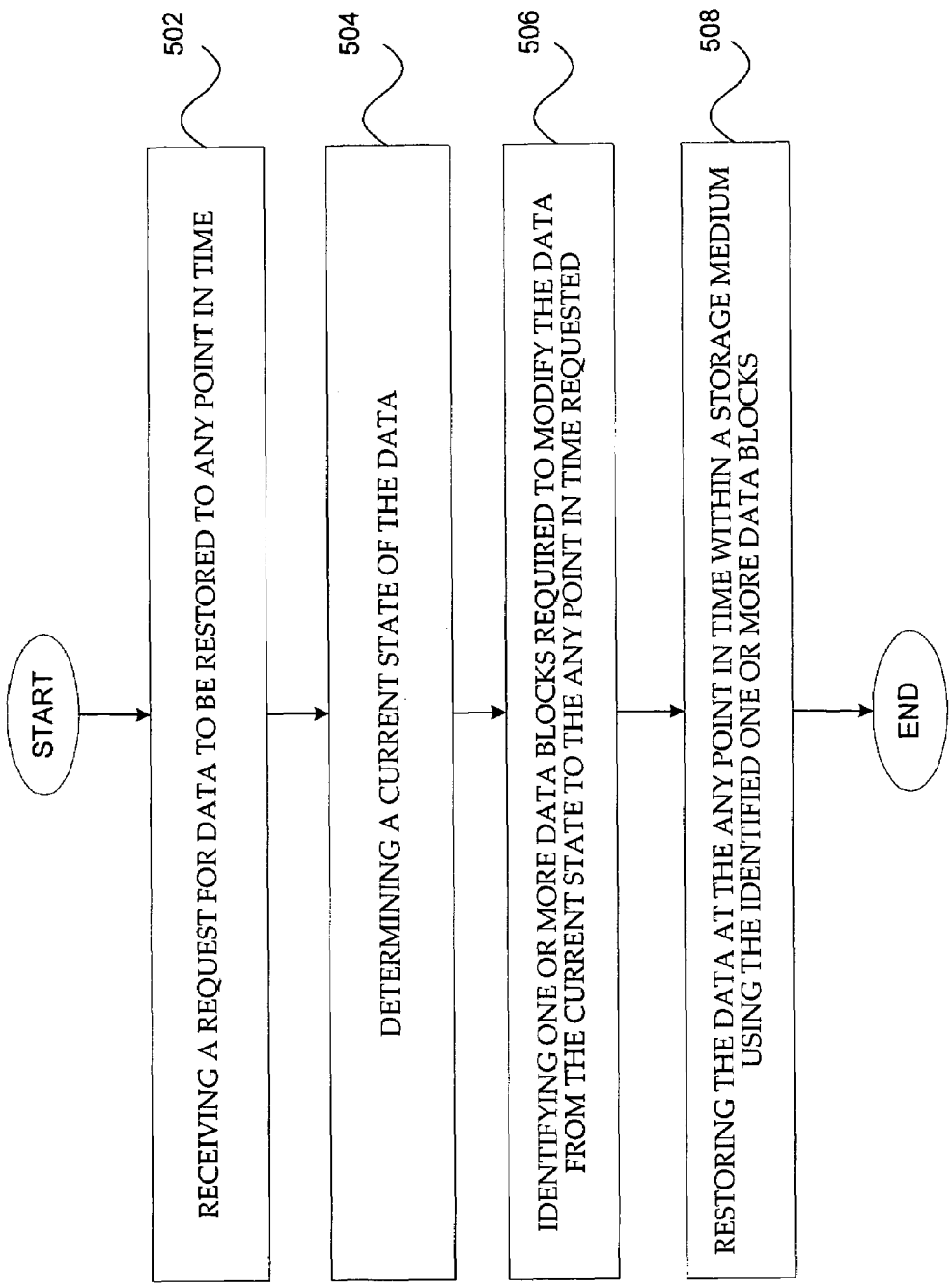
FIG. 5 illustrates a flow diagram of an exemplary process for optimizing restoration of stored data.

FIG. 5 illustrates a flow diagram showing an exemplary process for optimizing restoration of stored data. At step 502, a request for data to be restored to any point in time is received. As discussed herein, the request may be received from any user, such as the user associated with the client device 302 discussed in FIG. 3. The request may define restoration to any point in time according to an actual date, time, event, and so forth.

At step 504, a current state of the data is determined. The current state of the data is determined by the recovery server 112. The recovery server 112 accesses the envelopes, discussed herein, to determine the current state of the data for the user making the request for the data to be restored. Alternatively, the current state of the data may be determined by accessing the primary storage 106 or the client device storage 304.

At step 506, one or more data blocks required to modify the data from the current state to the any point in time requested are identified. As discussed herein, the recovery server 112 may compare the current state of the data in the protected storage of the user making the request via the envelopes with the desired state of the data according to the request.

At step 508, the data is restored to the any point in time within a storage medium using the identified one or more data blocks. As discussed in association with FIG. 4, if the user making the request for the restored data continues to generate data block on the client device 302, the data blocks are buffered and transferred to the client device storage 304 or other storage when the restoration of the data is complete. However, if the user making the request for the restored data utilizes the historical view of the restored data to continue generating data blocks, the data blocks that continue to be generated utilizing the historical view are buffered at the recovery server 112 and transferred to the client device storage 304 or other storage when the restoration of the data is complete on the client device storage 304.

While various embodiments have been described above, it should be understood that they have been presented by way of example only, and not limitation. For example, any of the elements associated with optimizing restoration of stored data may employ any of the desired functionality set forth hereinabove. Thus, the breadth and scope of a preferred embodiment should not be limited by any of the above-described exemplary embodiments.

What is claimed is:

1. A method for optimizing restoration of stored data comprising:
   receiving a request for data to be restored to any point in time;
   determining a current state of the data;
   identifying one or more data blocks required to modify the data from the current state to the any point in time requested;
   determining an optimal restoration based on the current state of the data determination and the identification of the one or more data blocks required to modify the data from the current state to the any point in time requested; and
   restoring the data at the any point in time within a storage medium using the identified one or more data blocks based on the optimal restoration determination.

2. The method recited in claim 1, further comprising utilizing the restored data as a basis for generating at least one additional data block.

3. The method recited in claim 2, further comprising buffering the additional at least one additional data block while the data is restored to the any point in time within the storage medium.

4. The method recited in claim 1, wherein the any point in time includes an event.

5. The method recited in claim 1, further comprising generating a historical view of the restored data to present to a user in response to the request for the data to be restored to any point in time.

6. The method recited in claim 5, further comprising allowing a user to generate at least one additional data block utilizing the historical view.

7. The method recited in claim 6, further comprising buffering the at least one additional data block while the data is restored to the any point in time within the storage medium.

8. The method recited in claim 7, further comprising mapping the at least one additional data block with a branching data structure.

9. The method recited in claim 1, wherein the one or more data blocks may comprise various sizes of data.

10. A system for optimizing restoration of stored data comprising:
    a recovery server configured to receive a request for data to be restored to any point in time, determine a current state of the data, identify one or more data blocks required to modify the data from the current state to the any point in time requested, determine an optimal restoration based on the current state of the data determination and the identification of the one or more data blocks required to modify the data from the current state to the any point in time requested; and
    a storage medium configured to be restored with the data to the any point in time from the identified one or more data blocks based on the optimal restoration determination.

11. The system recited in claim 10, further comprising a computing device associated with a user configured to utilize the restored data as a basis for generating at least one additional data block.

12. The system recited in claim 11, wherein the computing device is further configured to buffer the additional at least one additional data block while the data is restored to the any point in time within the storage medium.

13. The system recited in claim 10, wherein the any point in time includes an event.

14. The system recited in claim 10, wherein the recovery server is further configured to generate a historical view of the restored data to present to a user in response to the request for the data to be restored to any point in time.

15. The system recited in claim 14, wherein the recovery server is further configured to allow a user to generate at least one additional data block utilizing the historical view.

16. The system recited in claim 15, wherein the recovery server is further configured to buffer the at least one additional data block while the data is restored to the any point in time within the storage medium.

17. The system recited in claim 16, wherein the at least one additional data block is mapped with a branching data structure.

18. The system recited in claim 10, wherein the one or more data blocks may comprise various sizes of data.

19. A computer program embodied on a computer readable medium having instructions for optimizing restoration of stored data comprising:
    receiving a request for data to be restored to any point in time; determining a current state of the data;

identifying one or more data blocks required to modify the data from the current state to the any point in time requested;

determining an optimal restoration based on the current state of the data determination and the identification of the one or more data blocks required to modify the data from the current state to the any point in time requested; and restoring the data at the any point in time within a storage medium using the identified one or more data blocks based on the optimal restoration determination.

20. The computer program recited in claim 19, further comprising utilizing the restored data as a basis for generating at least one additional data block.

21. The computer program recited in claim 20, further comprising buffering the additional at least one additional data block while the data is restored to the any point in time within the storage medium.

22. The computer program recited in claim 19, wherein the any point in time includes an event.

23. The computer program recited in claim 19, further comprising generating a historical view of the restored data to present to a user in response to the request for the data to be restored to any point in time.

24. The computer program recited in claim 23, further comprising allowing a user to generate at least one additional data block utilizing the historical view.

25. The computer program recited in claim 24, further comprising buffering the at least one additional data block while the data is restored to the any point in time within the storage medium.

26. The computer program recited in claim 25, further comprising mapping the at least one additional data block with a branching data structure.

27. The computer program recited in claim 19, wherein the one or more data blocks may comprise various sizes of data.

* * * * *